(12) United States Patent
Yoo

(10) Patent No.: US 10,341,262 B2
(45) Date of Patent: Jul. 2, 2019

(54) PACKET OR PASSIVE OPTICAL NETWORK SYSTEM WITH PROTECTION SWITCHING CAPABILITIES

(71) Applicant: ELECTRONICS AND TELECOMMUNICATIONS RESEARCH INSTITUTE, Daejeon-si (KR)

(72) Inventor: Tae Whan Yoo, Daejeon-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 597 days.

(21) Appl. No.: 14/883,829

(22) Filed: Oct. 15, 2015

(65) Prior Publication Data

US 2016/0112303 A1    Apr. 21, 2016

(30) Foreign Application Priority Data

Oct. 15, 2014  (KR) .................. 10-2014-0139170

(51) Int. Cl.
```
G02F 1/00      (2006.01)
H04L 12/939    (2013.01)
H04Q 11/00     (2006.01)
H04L 12/707    (2013.01)
```
(52) U.S. Cl.
CPC ............ *H04L 49/552* (2013.01); *H04L 45/24* (2013.01); *H04Q 11/0067* (2013.01); *H04Q 2011/0081* (2013.01)

(58) Field of Classification Search
CPC .. H04B 10/032; H04B 10/035; H04B 10/071; H04B 10/272; H04Q 11/0067; H04Q 11/0003; H04Q 11/0005; H04L 45/22; H04L 49/552
USPC ........ 398/2, 3, 4, 5, 10, 13, 177, 66, 67, 68, 398/69, 70, 71, 72, 79, 33, 100, 45, 48, 398/49, 16, 22, 23, 24, 25; 370/352, 392, 370/389, 468, 465, 225, 228
See application file for complete search history.

(56) References Cited

U.S. PATENT DOCUMENTS

| | | | |
|---|---|---|---|
| 5,790,286 A * | 8/1998 | Bae ...................... | H04B 10/032 370/221 |
| 7,843,933 B2 | 11/2010 | Naito et al. | |
| 8,144,711 B1 | 3/2012 | Pegrum et al. | |
| 2008/0131124 A1* | 6/2008 | Nam .................... | H04B 10/032 398/67 |
| 2010/0183298 A1 | 7/2010 | Biegert et al. | |
| 2010/0183300 A1 | 7/2010 | Yokotani | |
| 2011/0044683 A1 | 2/2011 | Trojer | |
| 2011/0069954 A1 | 3/2011 | Hu et al. | |
| 2011/0268435 A1 | 11/2011 | Mizutani et al. | |
| 2011/0317955 A1 | 12/2011 | Mayston et al. | |
| 2012/0045199 A1 | 2/2012 | Sun et al. | |

(Continued)

*Primary Examiner* — Hanh Phan
(74) *Attorney, Agent, or Firm* — Ladas & Parry LLP

(57) ABSTRACT

A packet or passive optical network system with packet-based protection switching capabilities is provided. The system performs comprehensive protection switching against failures in all segments of a passive optical network (PON), thereby implementing lossless protection switching against failures in any segment in a packet network and against failures in any segment of the PON that consists of optical line terminals (OLTs), optical cables, optical network units (ONUs) of a PON system.

5 Claims, 18 Drawing Sheets

(56) References Cited

U.S. PATENT DOCUMENTS

2014/0105592 A1* 4/2014 Kataria ................ H04B 10/032
  398/2
2014/0226966 A1* 8/2014 Lutgen ................ H04J 14/0283
  398/5

* cited by examiner

PACKET OR PASSIVE OPTICAL NETWORK SYSTEM WITH PROTECTION SWITCHING CAPABILITIES

CROSS-REFERENCE TO RELATED APPLICATION(S)

This application claims priority from Korean Patent Application No. 10-2014-0139170, filed on Oct. 15, 2014, in the Korean Intellectual Property Office, the disclosure of which is incorporated herein by reference in its entirety.

BACKGROUND

1. Field

The following description relates to a packet or passive optical network, and more particularly, to a packet or passive optical network capable of packet-based protection switching against passive optical network (PON) failures.

2. Description of the Related Art

So far, various forms of passive optical network (PON) protection switching architectures and mechanisms have been suggested, such as the PON protection switch and protection switching method disclosed in US Patent Application No. 2010/0183298 discloses such a. However, the existing protection switching architectures have a range of problems. For example, the protection switching architecture may be costly or may not address inherent limitations of the PON. In addition, the application of the conventional protection switching architecture to the presently popular time-division-multiple-access-PON (TDMA-PON), such as an Ethernet PON (EPON) and Gigabit-capable PON (GPON) may not be possible; also some protection switching architectures can only deal with failures in particular segments of a network, making them inapplicable to a system that has to be capable of handling failures in the entire network.

In recent years, the application of PON has been widened to broadband access networks for various services, such as wired and wireless convergence. Accordingly the importance of protection switching is increasing. Regarding PON protection switching, ITU-T G. 983.1 Appendix IV describes four mechanisms for forming optical lines in a PON system, namely, fiber duplex, OLT-PON duplex, full duplex, and partial duplex, but does not specify a protection switching mechanism and apparatus that utilizes the optical lines.

Particularly, protection switching in TDMA-PON has distinctive characteristics, compared to general network equipment. First, TDMA-PON protection switching is performed characteristically between network equipment and a general subscriber device, not between pieces of network equipment. Due to cost incurred to perform protection switching, some subscribers may not want protection switching.

For instance, some subscribers may only want a level of protection switching that allows for losses to occur so long as the amount does not cause service interruption, while other subscribers may want complete lossless protection switching. Therefore, only a system with protection switching architecture and functions that are responsive to various needs of subscribers can be employed as a universal protection switching mechanism. At this time, the minimization of cost incurred from protection switching should be considered.

Second, the PON architecture itself is the characteristic feature, in that it selectively performs protection switching that is optimal to a specific segment at which a failure has occurred in the PON system can reduce the influence of the failure and incur less implementation cost. Hence, when compared to general protection switching for communication devices, TDMA-PON protection switching cannot be implemented using only one protection switching mechanism. In a TDMA-PON protection switching architecture, different protection switching functions are mixed, and thus the different protection switching functions need to be allowed to interact with each other.

Third, the TDMA-PON protection switching is related to packet services. For packet services, packet paths are determined by autonomous functions (routing, switching, etc.) of communication devices, such as a router and a switch. In the event of a failure, the failure is reflected in autonomous functions and, in turn, a new packet path is determined. In this case, it takes a significant length of time for the system to acclimatize to the new path after the failure, and data loss and duplication cannot be avoided.

Hence, improving a protocol to adapt promptly to network changes can be one method for resolving aforementioned issues of data loss and duplication, but a more reliable method for protection switching in a packet network would be to designate a protection switching path beforehand, detect any failures using a network management control function or a network's autonomous function, and quickly switch the path to a protecting switching path upon detection of a failure. Although PON link segment of TDMA-PON, itself, does not exhibit such packet characteristics, packet protection switching characteristics cannot be ignored in this segment since the next upper layer generally functions as L2/L3 and protection switching is terminated in such a layer.

As related arts, both U.S. Pat. Nos. 7,843,933 and 8,144,711 each disclose that identical packets are sent through a plurality of packet paths and a receiver terminal selects one path from the multiple packet paths, thus receiving a normal packet; in the event of a failure on the selected path, the receiver terminal changes the receiving path from the selected path to another path among the multiple paths in order to receive a normal packet.

Both related arts suggest the operations to be performed based on packet sequence numbers. That is, a transmitter side sends a packet with a sequence number attached thereto, and a receiver side confirms receiving the identical packets based on the sequence numbers and performs filtering. This method may be advantageous in a case where the sequence numbers can be attached to packets, but in the case of PON, an additional field has to be defined to assign a sequence number to an Ethernet frame.

As described above, PON protection switching mechanisms to date focus on only some functions, and thus it is difficult to find an optimal mechanism that satisfies the aforementioned TDMA-PON protection switching characteristics/requirements, and the application of the previously suggested packet protection switching mechanism to the PON is not easy. Therefore, the applicant suggests a packet-based PON protection switching mechanism which is provided by applying the packet protection switching to a PON system so as to improve the existing packet protection switching mechanism and thus satisfy the TDMA-PON protection switching characteristics/requirements.

SUMMARY

The following description relates to a packet-based protection switching mechanism, and to a packet or passive optical network system that performs comprehensive protection switching against failures in all segments of a passive optical network (PON), thereby implementing protection switching against failures in any segment of the PON that consists of optical line terminals (OLTs), optical cables, optical network units (ONUs) of a PON system.

In one general aspect, there is provided a packet or passive optical network system with a packet-based protection switching capability, including: a transmitter terminal; a plurality of packet paths; and a receiver terminal, wherein the receiver terminal receives a packet that arrives first among identical packets transferred through the plurality of packet paths and discards packets that arrive after the first packet.

The receiver terminal may include: a duplicate reception prevention filter configured to normally receive the packet that arrives first among the identical packets transferred through the plurality of packet paths and discard packets that arrive after the first packet; and a normal received packet record configured to store a packet that has been previously normally received or a packet identifier of the normally received packet, thereby enabling the duplicate reception prevention filter to determine whether the same packet as the stored packet arrives at the receiver terminal.

The receiver terminal may further include a reception frequency record configured to count the number of times identical packets are received through the plurality of packet paths in order to enable deletion of a record of the identical packet from the normal received packet record when it is confirmed that the identical packets are received through all packet paths.

When at least two packet paths carry identical packets and the same packet as the received packets is stored in the normal received packet record, the duplicate reception prevention filter may discard the received packets, and otherwise if the same packet as the received packets is not present in the normal received packet record, the duplicate reception prevention filter may normally receive the packets and store the received packets or identifiers of the packets in the normal received packet record.

The receiver terminal may measure the time that has elapsed since a packet or its packet identifier was stored in the normal received packet record and, in turn, delete a record of the packet after a sufficient amount of time.

In another general aspect, there is provided a packet or passive optical network system with a packet-based protection switching capability, including: a packet-path-based protection switching receiver terminal capable of autonomous failure detection and lossless protection switching without correlation with a transmitter terminal and configured to: set one packet path as a working channel, among a plurality of packet paths through which identical packets are transferred; set remaining packet paths as auxiliary channels; normally receive a packet that is transferred through the working channel; and store packets that are transferred through the auxiliary channels only and not through the working channel, so that the packets can be normally received after protection switching, whereby when a failure occurs in the working channel, a packet loss is prevented during protection switching from the working channel to one of the auxiliary channels.

The packet-path-based protection switching receiver terminal may include: a receiving channel selection switch configured to select the working channel from the plurality of packet paths; a working-channel received packet processor configured to process normal receiving operation for the packet transferred through the selected working channel; a normal received packet record configured to make a record of a normally received packet; a received packet processor configured to process packets received by each receiver of each auxiliary channel; and a receiver buffer configured to store received packets that are transferred through the plurality of packet paths and not through the working channel.

The packet-path-based protection switching receiver may further include an elapsed-time manager configured to measure the time that has elapsed since packet or its packet identifier was stored in the each receiver buffer or in the normal received packet record, and, in turn, delete a record of the packet from the each receiver buffer or the normal received packet record after a sufficient amount of time.

The packet-path-based protection switching receiver terminal may further include a reception frequency record configured to count the number of times identical packets are received through the packet paths and delete a packet identifier of the identical packet from the normal received packet record when all packet paths carry the identical specific packets.

In yet another general aspect, there is provided a packet or passive optical network system with a protection switching capability, including: an N:1 packet-path protection switching transmitter terminal comprising a re-transmission processor, a transmitted packet record, and a transmission channel switch; and an N:1 packet-path protection switching receiver terminal comprising a re-reception processor and a final received packet record, wherein a working channel that carries a packet between the transmitter terminal and the receiver terminal and one or more auxiliary channels that does not carry packets but is used as a bypass in the event of a failure on the working path are formed, so that N:1 packet-path protection switching of a high bandwidth usage efficiency is performed.

The N:1 packet-path protection switching transmitter terminal may further include an elapsed-time manager configured to record time of initially storing each packet and delete the each packet from the transmitted packet record after a length of time enough for the N:1 packet-path protection switching receiver terminal to normally receive each packet.

In still another general aspect, there is provided a packet or passive optical network system with a packet-based protection switching capability, including: a comprehensive packet-based protection switching transmitter terminal comprising a re-transmission processor, a transmitted packet record, an elapsed-time manager, and a transmission path switch; and a comprehensive packet-based protection switching receiver comprising a receiver buffer for each packet path, an elapsed-time manager for each packet path, a received packet processor for each packet path, a receiving channel selection switch, a working-channel received packet processor, a normal received packet record, a reception frequency record, an elapsed-time manager, and a final received packet indicator, wherein depending on the nature of the failure that has occurred, an optimal protection switching mechanism is operated based on protection switching functions provided to both the transmitter terminal and receiver terminal, so that packet-based protection switching, packet-path-based protection switching, and N:1 packet-path-based protection switching are performed with a single functional architecture.

In yet another general aspect, there is provided a packet or passive optical network system with a packet-based protection switching capability, including: a 2:N, comprehensive packet-based protection switching master transceiver terminal which comprises: a transmitter terminal comprising a re-transmission processor, a received packet record, an elapsed-time manager, a first-stage switch for protection switching transmission paths that are distinguished by logical channels, wherein the logical channels are distinguished by a wavelength/frequency-division method or a time-division method, and a second-stage switch for protection switching paths in a trunk segment in a 2:N shared network; and a receiver terminal comprising a receiver buffer for each packet path, an elapsed-time manager for each packet path, a received packet processor for each packet path, a receiving channel selection switch, a working-channel received packet processor, a normal received packet record, a reception frequency record, and an elapsed-time manager, wherein the receiving channel selection switch separates the logical channels, distinguished by the wavelength-/frequency-division method or the time-division method, and paths in the trunk segment of the 2:N shared network and selects a receiving channel so that optimal protection switching is performed according to a location at which a failure occurs in the 2:N shared network.

The packet or passive optical network system may further include a 2:N comprehensive packet-based protection switching slave transceiver terminal which comprises: a transmitter configured to function as a comprehensive packet-based protection switching transmitter terminal, exclusive of a function of N:1 packet-path-based protection switching transmitter; and a receiver configured to function as a comprehensive packet-based protection switching receiver terminal, so that optimal protection switching is performed according to a location at which a failure occurs in the 2:N shared network.

In yet another general aspect, there is provided a packet or passive optical network system with a packet-based protection switching capability for performing 2:N comprehensive packet-based protection switching in a passive optical network, the packet or passive optical network including: an optical line terminal (OLT) transmitter comprising a 2:N comprehensive packet-based protection switching master transceiver terminal between a PON-Bridge module and a PON-MAC module and a transmission path switch for selecting one out of two or more optical transmitters as an output; and an OLT receiver configured to enable packet-based or packet-path-based protection switching by receiving all signals incoming through two or more optical transmitters and connecting the signals to each of receivers of a PON-MAC module to receive signals from all channels.

The packet or passive optical network system may further include a 2:N comprehensive packet-based protection switching slave transceiver terminal between an ONU PON-Bridge module and an ONU PON-MAC module to perform 2:N comprehensive packet-based protection switching on a PON.

The packet or passive optical network system may further include an ONU configured to only provide a re-reception processing function using one receiving path network and not to provide any other functions regarding N:1 packet-path protection switching.

The ONU may include a comprehensive protection switching receiver terminal that functions as a receiver terminal with respect to two or more paths in N:1 packet path protection switching, and a comprehensive protection switching transmitter terminal that performs simple protection transmission to two channels.

The packet or passive optical network system may further include an ONU configured to be provided with a packet-based protection switching receiver function with respect to two or more paths and perform 2:N comprehensive packet-based protection switching in a PON.

The packet or passive optical network system may further include an ONU configured to be provided with a packet-path-based protection switching receiver function with respect to two or more paths and perform 2:N comprehensive packet-path-based protection switching in a PON.

Other features and aspects will be apparent from the following detailed description, the drawings, and the claims.

Figure 1:
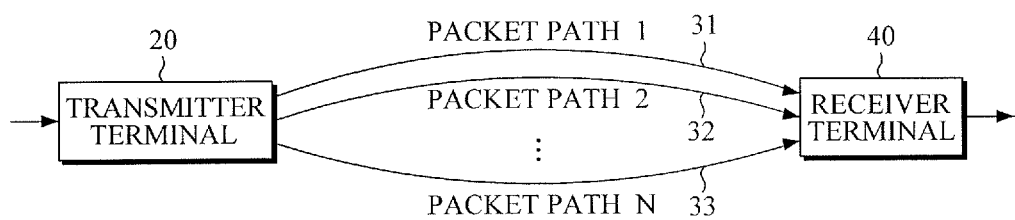
FIG. 1 is a block diagram illustrating an exemplary embodiment of a packet or passive optical network system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 is a block diagram illustrating an exemplary embodiment of a packet or passive optical network system. As shown in FIG. 1, the passive optical network (PON) system consists of a transmitter terminal 20, a receiver terminal 40, and a plurality of packet paths 31, 32, and 33 which connect the transmitter terminal 20 and the receiver terminal 40.

The transmitter terminal 20 transmits the identical packets to the receiver terminal 40 via the plurality of packet paths 31, 32, and 33. When receiving the packets through the multiple packet paths, the receiver terminal 40 selects one from the received identical packets and discards the packets that arrive later, thereby ensuring the normal transmission of the packet if there is at least one normally working packet paths among the multiple packet paths.

Figure 2:
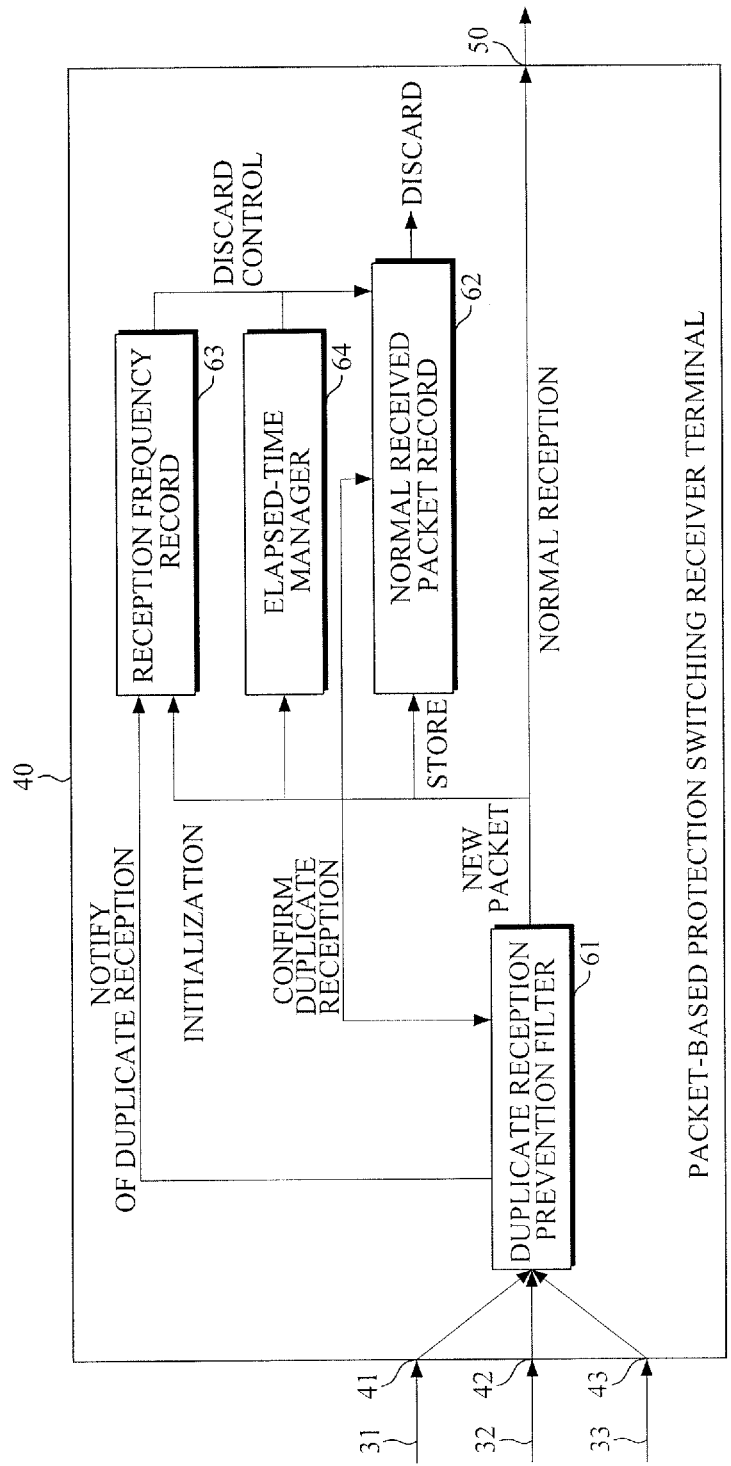
FIG. 2 is a block diagram illustrating an exemplary embodiment of a packet or passive optical network system with packet-based protection switching capabilities.

FIG. 2 is a block diagram illustrating an exemplary embodiment of a packet or passive optical network system with packet-based protection switching capabilities. The present exemplary embodiment reveals packet-based protection switching architecture, which implements a function of a receiver terminal to select packets on a packet-by-packet basis Referring to FIG. 2, the receiver terminal 40 includes: a plurality of input terminals 41, 42, and 43; a duplicate reception prevention filter 61; a normal received packet record 62 for recording a normally-received packet; a reception frequency record 63 for counting the number of times identical packets are received; an elapsed-time manager 64; and an output terminal 50.

When packets traveling through a plurality of packet paths 32, 32, and 33 are received through the respective input terminals 41, 42, and 43, the duplicate reception prevention filter 61 checks for any packet identifiers that are the same as those of the received packets present in the normal received packet record 62, and, if the same packet identifier is already present, drops that specific packet that corresponds to the packet identifier. Then, the duplicate reception prevention filter 61 allows the reception frequency record 63 to increase the number of times the specific packet has been received by an increment of one.

For example, if two packet paths carry identical packets and the normal received packet record 62 has the packet identifier that is the same as those of the two packets, the duplicate reception prevention filter 61 deletes the records of the corresponding packets from the normal received packet record 62.

In addition, when unable to find in the normal received packet record 62 the same packet identifier as that of a received specific packet, the duplicate reception prevention filter 61 forwards the received specific packet, as a normally received packet, to the output terminal 50, stores a packet identifier of the specific packet in the normal received packet record 62, and sets the number of times it has received the packet to 1 in the reception frequency record 63.

When it is confirmed that the identical packets were received through all packet paths and the number of times the pertinent packet received is equal to the number of normally working channels, the normal received packet record 62 discards the corresponding packet identifier in the elapsed-time manager 64.

In addition, the elapsed-time manager 64 discards a specific packet identifier from the normal received packet record 82 when a sufficient length of time elapses after the specific packet identifier was stored. At this time, the "sufficient length of time" is determined by taking into consideration the maximum value of the path differences of the multiple packet paths.

Here, the packet identifier may be a packet itself, a hash value of all or some of packets, and a sequence number of a packet as long as the uniqueness of the packet during the time corresponding to the path difference is ensured with a high probability.

If there are 2 packet paths, the reception frequency record 63 may be omitted. In this case, when a specific duplicate packet is redundantly received, both the duplicate packet and its packet identifier in the normal received packet record 62 are both deleted, rather than recording the number of times the specific packet was received.

In the exemplary embodiment illustrated in FIG. 2, regardless of any faults or failures on the packet paths, the normal packet that has arrived first at the receiver terminal through one of the plurality of packet paths is received, and thus packet-based protection switching is performed in real-time.

Although the above mechanism is very efficient, packet loss may occur or an out-of-sequence packet may come to exist when packet loss intermittently takes place on a certain channel throughout the paths. Specifically, the probability of such occurrences is relatively very low, compared to other mechanisms; but because the packet is received without a status notification that a failure has occurred (i.e. a 'failure state information'), it cannot be ensured that packets will not be lost or that there will be any out-of-sequence packets.

Figure 3:
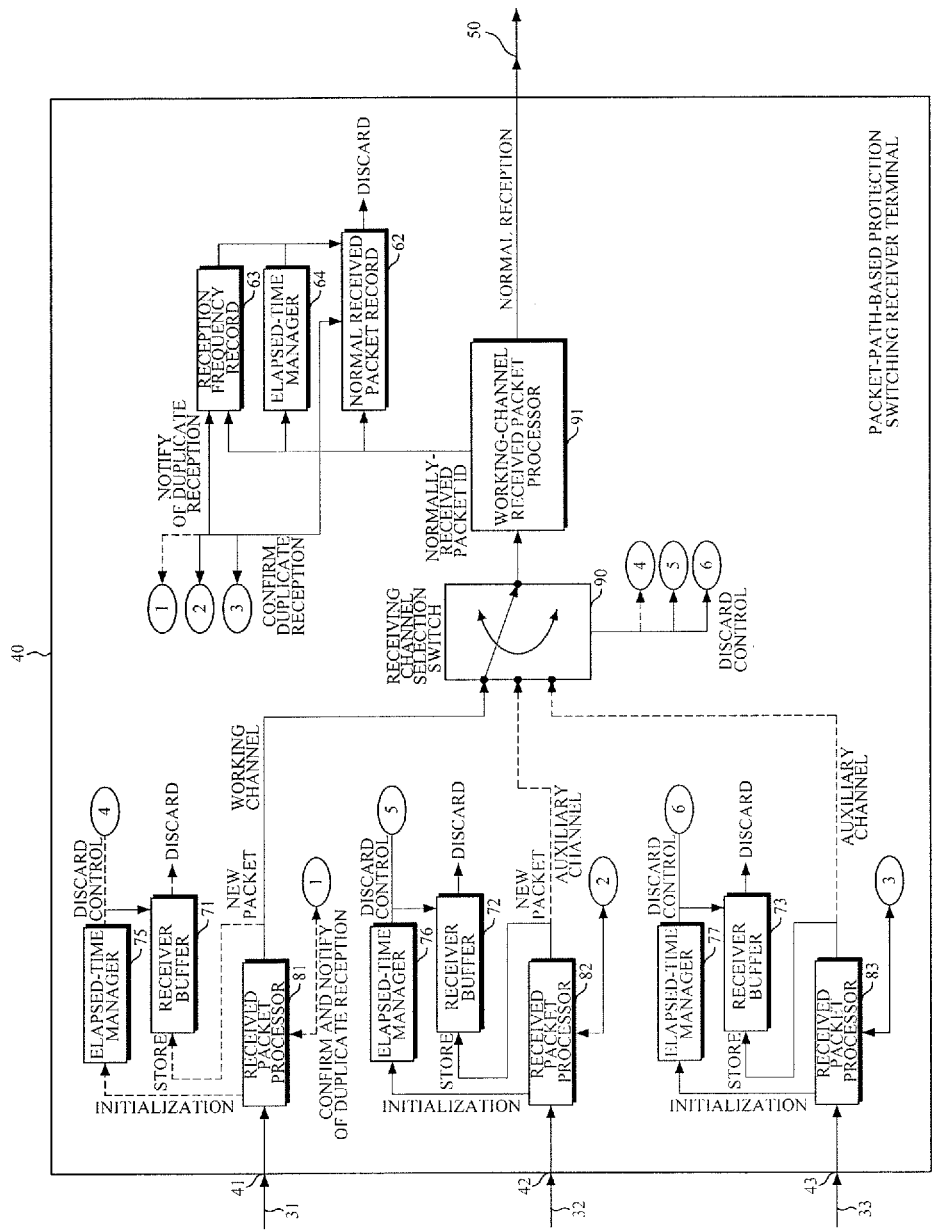
FIG. 3 is a block diagram illustrating another exemplary embodiment of a packet or passive optical network system with packet-based protection switching capabilities.

FIG. 3 is a block diagram illustrating another exemplary embodiment of a packet or passive optical network system with packet-based protection switching capabilities. The present exemplary embodiment is directed to a packet-path-based protection switching architecture, which implements a function of a receiver terminal that selects a packet based on failure state information of a packet.

Referring to FIG. 3, the receiver terminal 40 includes receiver buffers 71, 72, and 73 for individual packet paths, elapsed-time managers 75, 76, and 77 for individual packet paths, received packet processors 81, 82, and 83 for individual packet paths, a receiving channel selection switch 90, a working-channel received packet processor 91 for processing a packet received through a working channel, a normal received packet record 62, a reception frequency record 63, and an elapsed-time manager 64 for a normally received packet.

One specific packet path 31 among a plurality of packet paths 31, 32, and 33 is designated as a working channel and the remaining packet paths 32 and 33 are set as auxiliary channels. A packet received through an input terminal 41 of the working channel is selected by the receiving channel selection switch 90 and then transferred to the working-channel received packet processor 91. Operations shown in FIG. 3 in dotted lines are not performed.

The working-channel received packet processor 91 transfers the received packet to an output terminal 50; simultaneously stores its packet identifier to the normal received packet record 62; sets the number of times of receiving the pertinent packet to 1 in the reception frequency record 63; checks whether the same packet is present in the receiver buffers 72 and 73 of the auxiliary channels; and, if the same packet is present in any of the receiver buffers 72 and 73, deletes the packet from the corresponding receiver buffers 72 and 73.

When packets are received through input terminals 42 and 43 of the auxiliary channels, the received packet processors 82 and 83 for the auxiliary channels checks whether any packet identifiers that are the same as those of the received packets are present in the normal received packet record 62, and, if the same packet identifier is present, drops the relevant received packet, as well as increases the number of times the specific packet was received by an increment of one in the reception frequency record 63; otherwise, the received packets are stored in the corresponding receiver buffers 72 and 73 of the auxiliary channels in the order of reception.

The packet or its identifier is deleted from the normal received packet record 62 when the number of times of receiving said packet is equal to the total number of normally working channels, or when the elapsed-time manager 64 confirms that a sufficient amount of time which is much greater than the time delay differences in packet delivery between all channels has passed.

Figure 4:
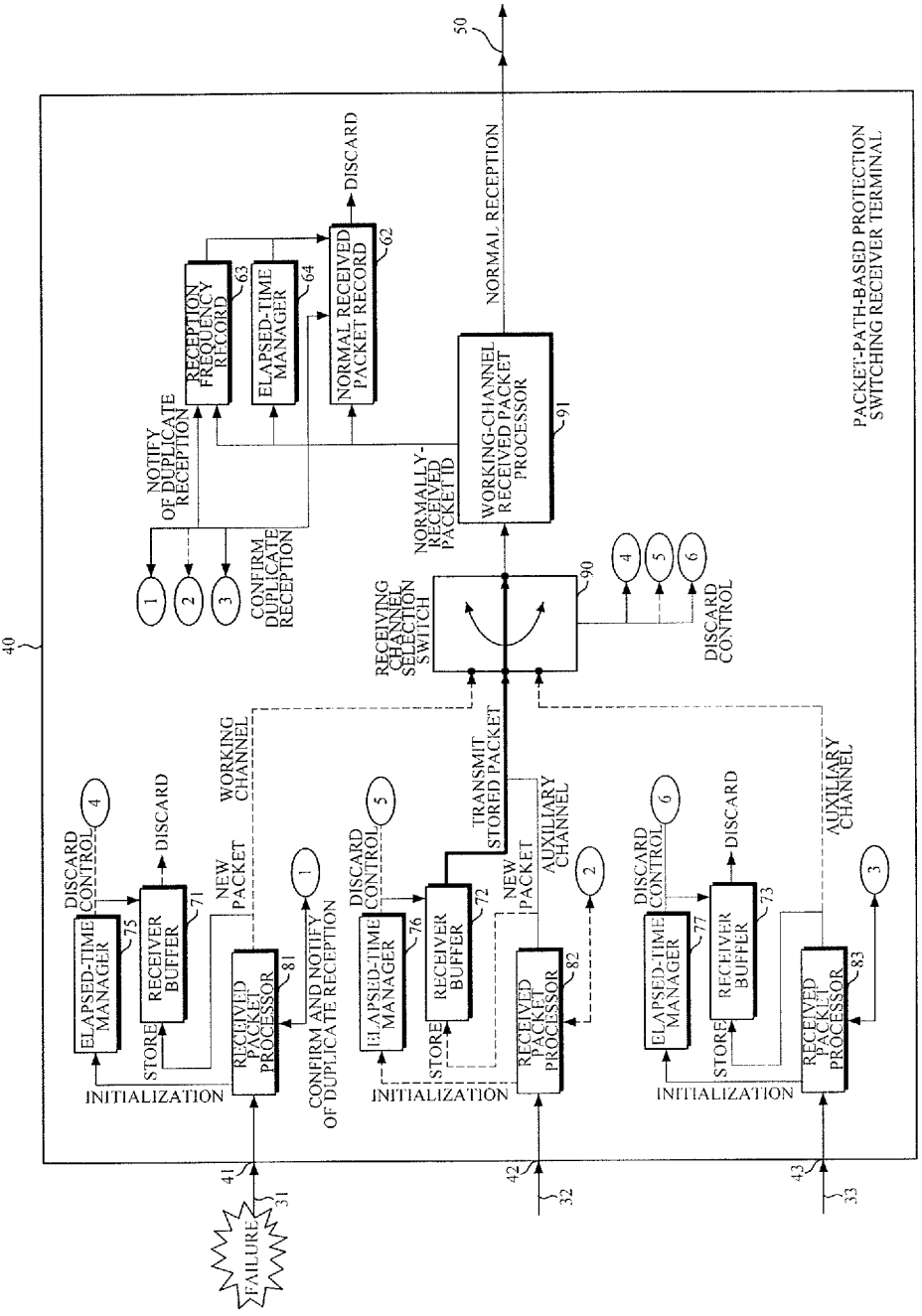
FIG. 4 is a diagram showing protection switching at a receiver terminal of the packet or passive optical network system of FIG. 3 when a failure occurs on a working channel.

FIG. 4 is a diagram showing protection switching at a receiver terminal of the packet or passive optical network system of FIG. 3 when a failure occurs on a working channel. When a failure occurs on a packet path 31 of a working channel, the working channel is switched from the packet path 31 of the current working channel to one of packet paths 32 and 33 of the auxiliary channels, and immediately after protection switching, the auxiliary channel 32 to which the working channel is switched performs a temporary reception procedure and then enters into a normal working state.

The temporary reception procedure is performed in two different ways depending on whether or not packets are stored in the receiver buffer 72. First, in the case where the packets are stored in the receiver buffer 72, the packets are transferred to the working-channel received packet processor 91 through the receiving channel selection switch 90 in the order the received packets were stored in the receiver buffer 72.

In this process, a packet received through the input terminal 42 is stored intact in the receiver buffer 72, and then transferred to the working-channel received packet processor 91 according to the order in which the packets were received. When packets in the receiver buffer 72 are exhausted, the received packet is instantly transferred to the working-channel received packet processor 91 so that the temporary reception procedure immediately after the protection switching is terminated.

The working-channel received packet processor 91 operates as it would in a normal state. However, the number of times receiving a specific packet which is a criterion for deleting the specific packet is reduced by the number of failure paths because it is equivalent to the number of currently working paths in a normal state.

Second, in the case where packets are not stored in the receiver buffer 72, the working-channel received packet processor 91 temporarily functions as an auxiliary-channel received packet processor of that is operating in a normal state. Specifically, the normal received packet record 62 checks whether it has received the same packet as a received specific packet or already has the same identifier as that of the received packet; if it is determined that the specific packet has been already received, the currently received packet is discarded, and the number of times receiving the specific packet is increased by an increment of one in the reception frequency record 63.

If the same packet or the identifier of the specific packet is not found, the received specific packet is transferred to the received packet processor 91, so that the temporary reception procedure is immediately terminated after protection switching. Thereafter, the switched auxiliary channel performs normal operations as a working channel. In operations of the working-channel received packet processor 91, only the number of receptions is decreased by the number of failure paths, and the other operations are performed in the same manner as before the failure. Also, in the same way, in the event of a failure in any of the auxiliary channels, only the number of receptions is decreased by the number of failure paths.

In the above procedures, a failure occurrence signal may be autonomously detected by a variety of means at the receiver terminal 40 or detected by external resources and forwarded to the receiver terminal 40. One method of autonomous detection of a failure occurrence signal would be that the failure is determined by detecting sudden changes in the number of packets or packet identifiers which are stored in the receiver buffer of the auxiliary channel or their packet identifiers.

The examples described with reference to FIGS. 1 to 4 are directed to the packet-based lossless protection switching mechanism in which the identical packets are transmitted through a plurality of paths. The transmission of the identical packets through a plurality of paths makes for disadvantageously low bandwidth usage efficiency.

Figure 5:
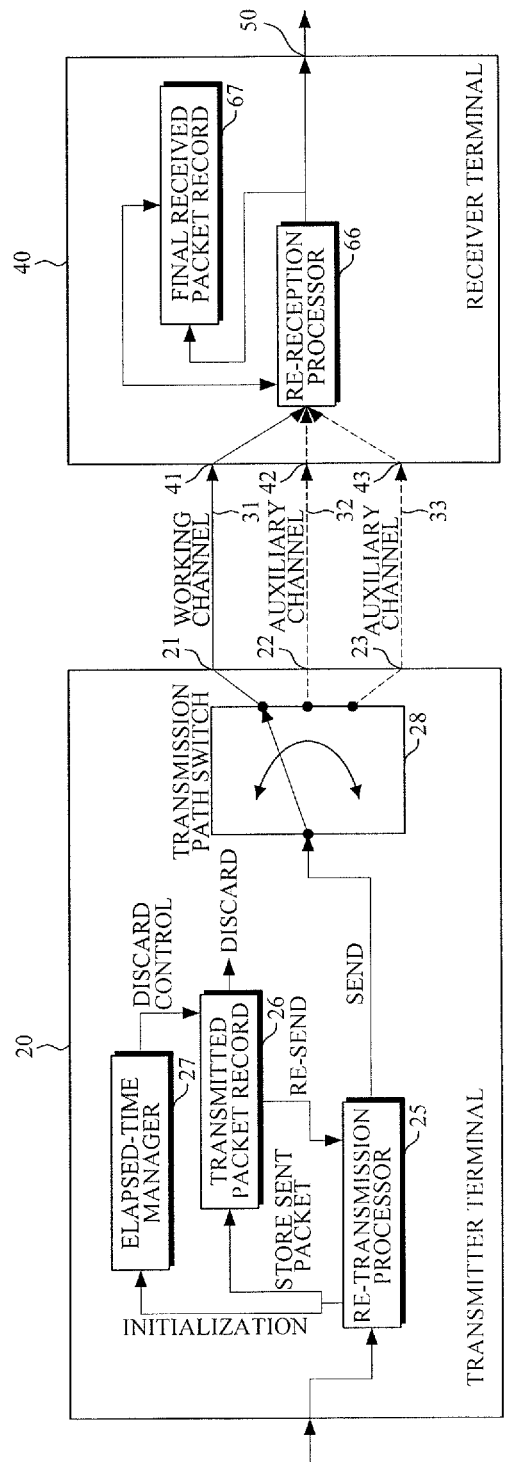
FIG. 5 is a block diagram illustrating another exemplary embodiment of a packet or passive optical network system with packet-based protection switching capabilities.

FIG. 5 is a block diagram illustrating another exemplary embodiment of a packet or passive optical network system with packet-based protection switching capabilities. FIG. 5 illustrates an N:1 packet-path-based protection switching mechanism in which one working path and one or more auxiliary paths are used.

Since a packet is transferred to a packet path 31 of the working channel but not transferred to packet paths 32 and 33 of the auxiliary channels, which may be used for other purposes, high bandwidth usage efficiency can be achieved. A transmitter terminal 20 includes a re-transmission processor 25, a transmitted packet record 26, an elapsed-time manager 27, and a transmission path switch 28. A receiver terminal 40 includes a re-reception processor 66 and a final received packet record 67.

In a normal working state, the transmitter terminal 20 transmits a packet and stores a record of the received packet in the transmitted packet record 26. The stored record of the transmitted packet is retained for a specific amount of time which is greater than double the packet delivery delay time between the transmitter terminal 20 and the receiver terminal 40. In this case, the elapsed-time manager 27 manages the time for which the record of transmitted packet is retained.

At the receiver terminal 40, although the working channel and the auxiliary channels are all available to receive a packet, only the working channel actually receives the packet. The packet transferred to an input terminal 41 through a packet path 31 of the working channel is normally received by the re-reception processor 66 and then transferred to an output terminal 50. Also, an identifier of the received packet is stored in the final received packet record 67. If a new packet is received, the final received packet record 67 updates the stored packet identifier so that it becomes the identifier of the new packet.

Figure 6:
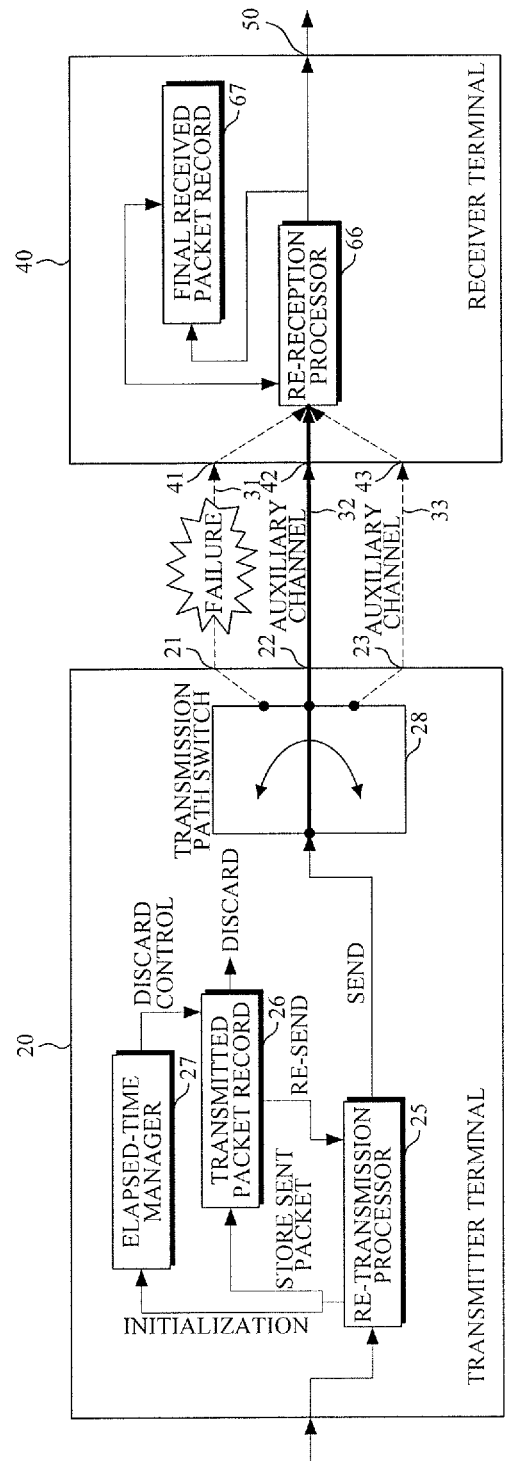
FIG. 6 is a diagram illustrating protection switching operations in the packet or passive optical network system of FIG. 5 when a failure occurs on a working channel.

FIG. 6 is a diagram illustrating protection switching operations in the packet or passive optical network system of FIG. 5 when a failure occurs on a working channel. Once a failure occurs, the receiver terminal 40 detects the failure and then informs the transmitter terminal 20 of the occurrence of the failure, or the transmitter terminal 20 autonomously detects the failure and recognizes the failure state.

Depending on the ways of they are implemented, various means can be used for the receiver terminal 40 to deliver a failure signal and for the transmitter terminal 20 to detect a failure. For example, an uplink channel of the packet path 32 of the auxiliary channel of FIG. 6 may be implemented for the receiver terminal 40 to inform the transmitter terminal 20 of the occurrence of a failure.

Immediately after the failure occurs, the transmission path switch 28 switches an output of the transmitter terminal 20 from the output terminal 21 of the previous working channel to the output terminal 22 of the auxiliary channel, and after the re-transmission processor 25 marks a packet for re-transmission, packets stored in the transmitted packet record 26 are sent to the output terminal 22 of the auxiliary channel in the order they were stored.

At the receiver terminal 40, immediately after the occurrence of failure is detected or when a packet marked for re-transmission is received, the re-reception processor 66 extracts an identifier from the received packet and checks whether the extracted identifier is identical to the packet identifier stored in the final received packet record 67; and, if the extracted identifier is not the same as the stored packet identifier, discards the received packet. The re-reception processor 66 continues to discard a received packet until it is determined that an identifier extracted from the received packet is the same as the packet identifier stored in the final received packet record 67. If it is determined that an identifier of a specific packet is the same as the stored packet identifier, the re-reception processor 66 normally receives packets after the specific packet.

The re-reception processor 66 always performs a normal receiving process for a packet which is not marked for re-transmission. In other words, the re-reception processor 66 sends the received packet to the output terminal 50, extracts a packet identifier from the received packet, and updates the packet identifier stored in the final received packet record 67. In this process, in order to synchronize protection switching between the transmitter terminal 20 and the receiver terminal 40, both re-transmission and re-reception are started once it has been confirmed that protection switching in the transmitter terminal and the receiver terminal have both been completed.

Figure 7:
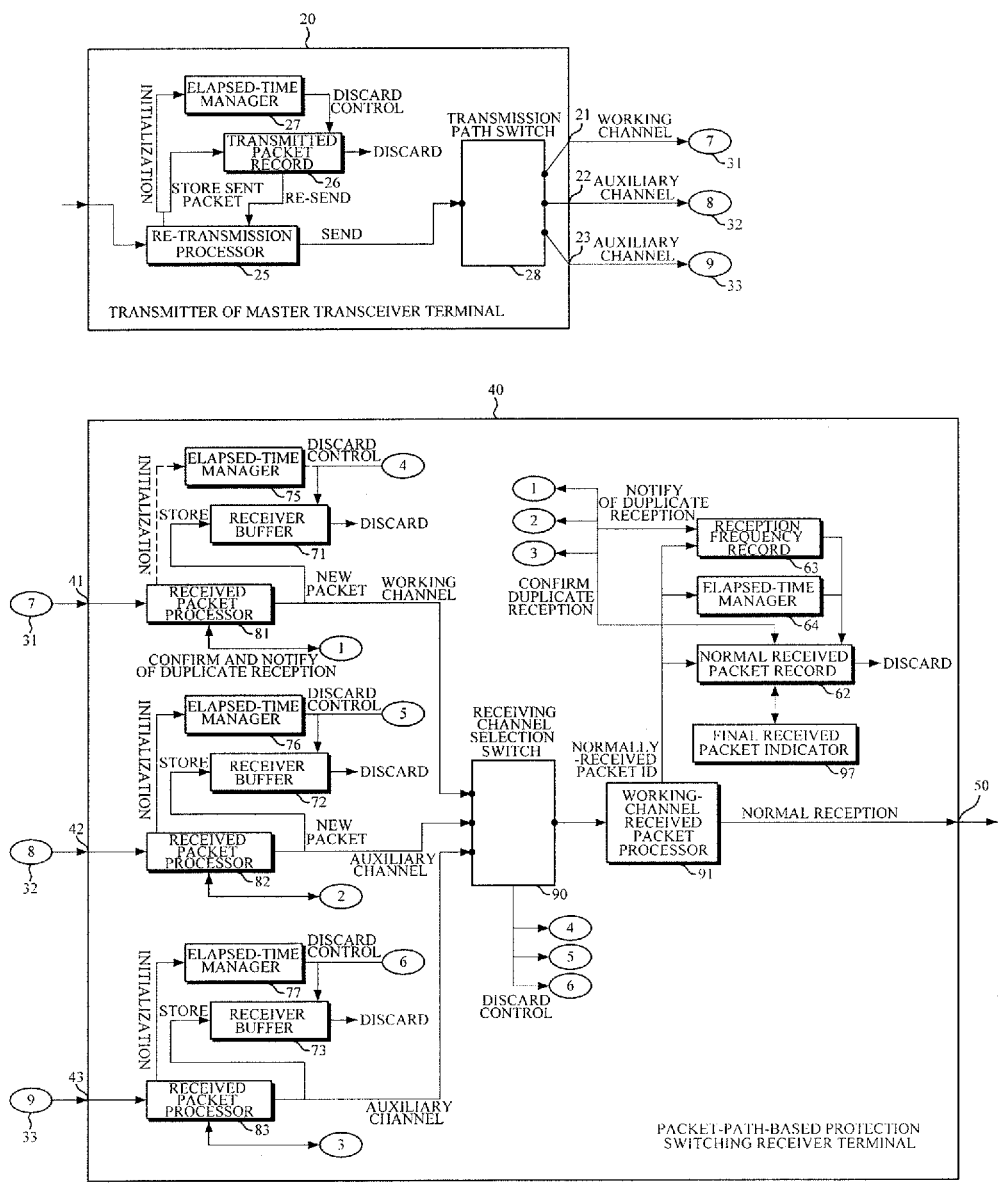
FIG. 7 is a block diagram illustrating yet another exemplary embodiment of the packet or passive optical network system with packet-based protection switching capabilities.

FIG. 7 is a block diagram illustrating yet another exemplary embodiment of the packet or passive optical network system with packet-based protection switching capabilities. The exemplary embodiment of FIG. 7 implements comprehensive packet-based protection switching by combining the capabilities of the network systems of FIG. 2, FIG. 3, and FIG. 5. A transmitter terminal and a receiver terminal both employ three different protection switching mechanisms, in which said terminals check each other's mechanisms, thereby automatically or manually selecting an optimal protection switching and performing the selected protection switching mechanism.

Referring to FIG. 7, the transmitter terminal 20 of a packet or passive optical network system includes a re-transmission processor 25, a transmitted packet record 26, an elapsed-time manager 27, and a transmission channel switch 28.

In addition, the receiver terminal 40 includes receiver buffers 71, 72, and 73 for each of a plurality of channels, elapsed-time managers 75, 76, and 77 for each channel, received packet processors 81, 82, and 83 for each channel, a receiving channel selection switch 90, a working-channel received packet processor 91, a normal received packet record 62, a reception frequency record 63, an elapsed-time manager 64, and a final received packet indicator 97.

A working channel packet path is denoted by reference numeral 31, and auxiliary channel packet paths are denoted by reference numerals 32 and 33. The final received packet indicator 97 tells the location of the last received packet in the normal received packet record.

Figure 8:
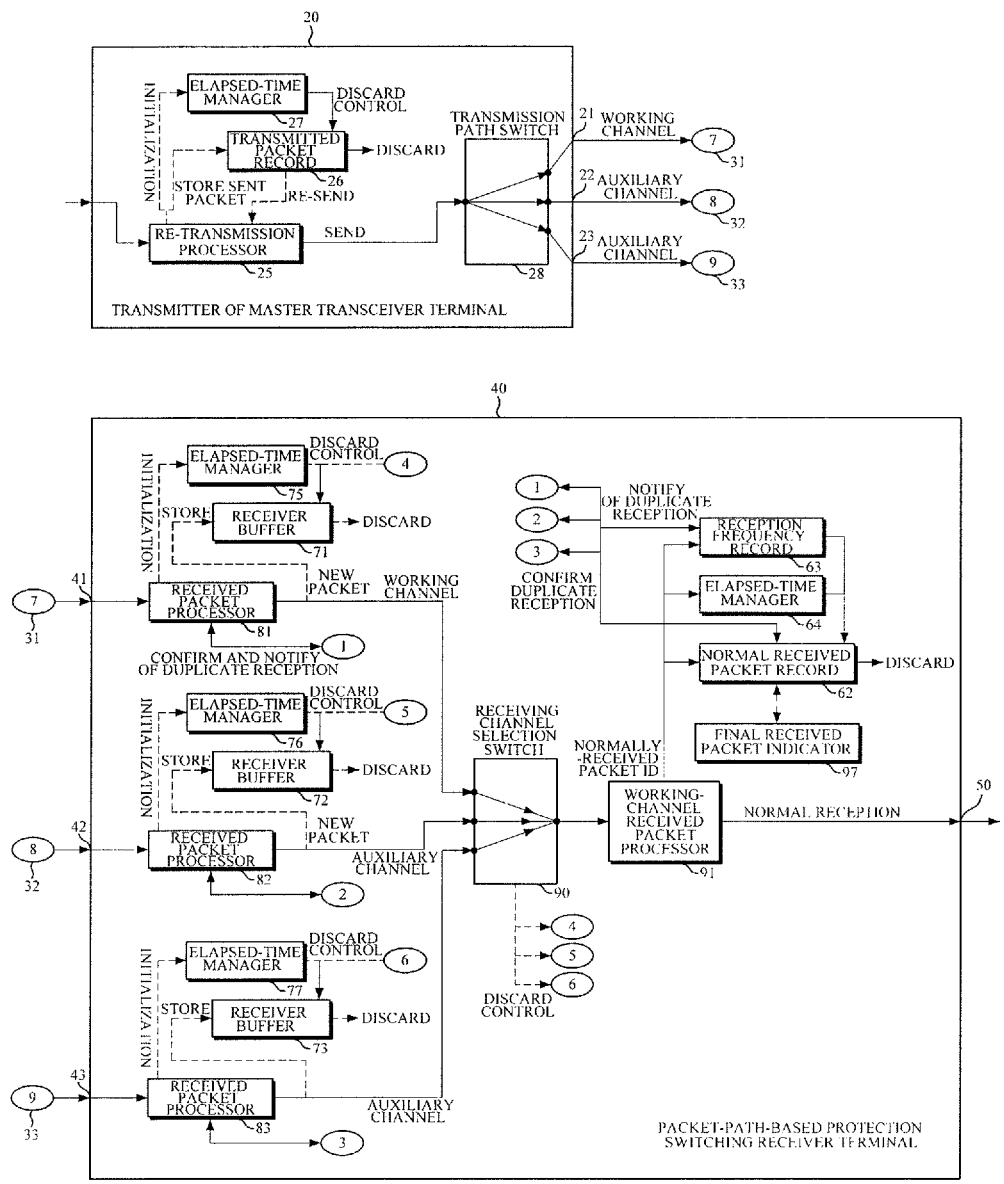
FIG. 8 is a diagram showing packet-based protection switching in the packet or passive optical network system shown in FIG. 7.

FIG. 8 is a diagram showing packet-based protection switching in the packet or passive optical network system shown in FIG. 7. Signal lines that are represented by dotted lines in FIG. 8 are not operational. Similar to the network system shown in FIG. 2, the transmitter terminal 40 sends the identical packets to all channels, and the receiving channel selection switch 90 at the receiver terminal 40 is set to be able to receive all packets carried by any receiving channels and then forwards the received packets to the working-channel received packet processor 91, which functions in the same manner as the duplicate reception prevention filter 61 in FIG. 2.

That is, if the received packet is not found in the normal received packet record 62, a normal receiving operation is performed, and if the same packet identifier as that of the currently received packet is found in the normal received packet record 62, the received packet is discarded. The management and discarding of the stored packet identifier in the normal received packet manager 62 are performed in the same manner as in the packet-based protection switching of FIG. 2.

Figure 9:
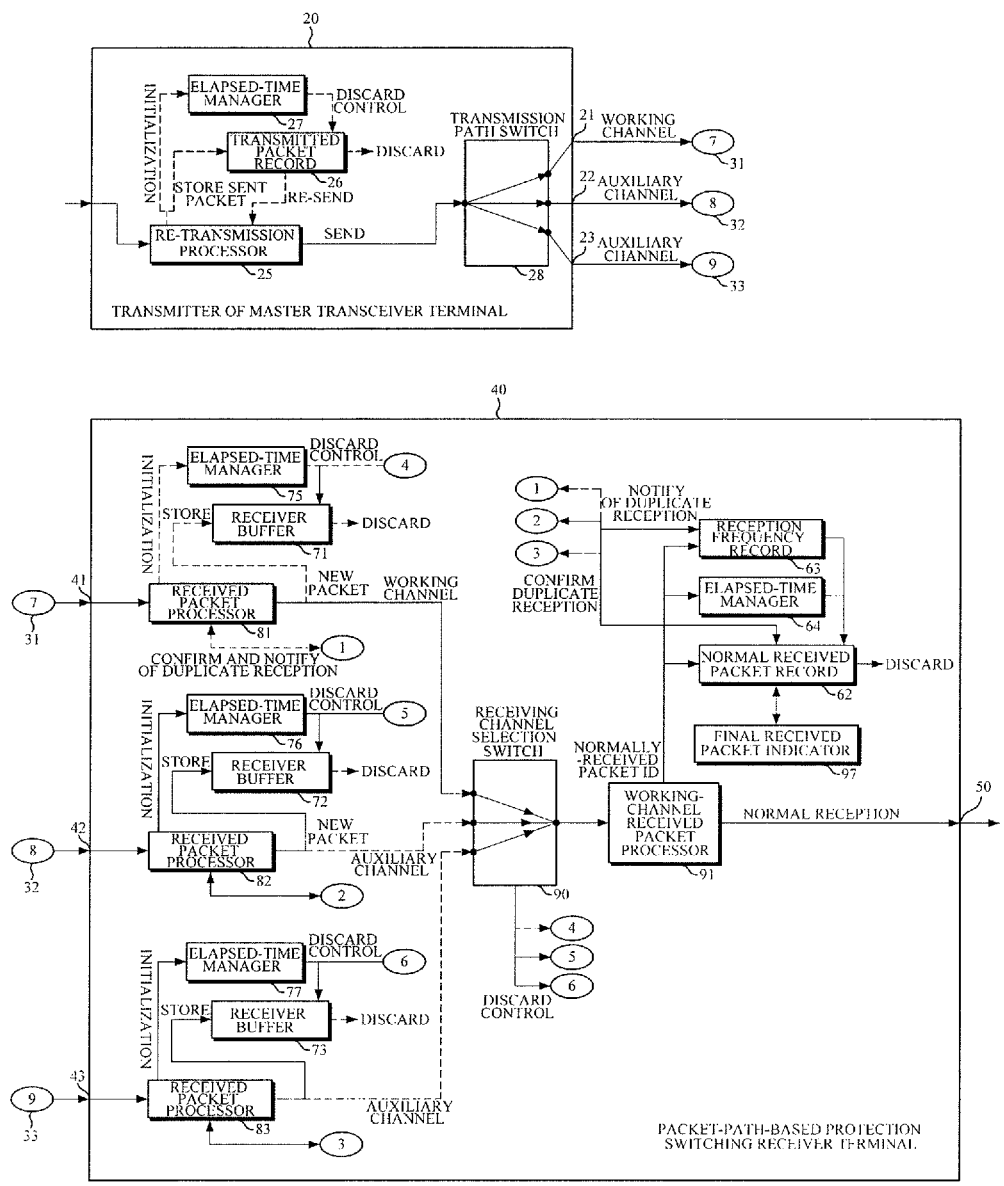
FIG. 9 is a diagram showing packet path-based protection switching in the packet or passive optical network system of FIG. 7.

FIG. 9 is a diagram showing packet path-based protection switching in the packet or passive optical network system of FIG. 7. Signal lines that are represented by dotted lines in FIG. 9 are not operated. As previously shown in FIG. 3, the transmitter terminal 20 sends the identical packets through a plurality of channels, and the components of the receiver terminal 40 (i.e., the received packet processors 81, 82, and 83; the receive buffers 71, 72, and 73) operate in a manner that is identical to that of FIG. 3. Furthermore, other components of the receiver terminal 40 include the elapsed-time managers 75, 76, and 77, which are provided for the respective input terminals 41, 42, and 43; the working-channel received packet processor 91; the normal received packet record 62; the reception frequency record 63; and the elapsed-time manager 64, and these also operate in the same manner as those of FIG. 3. The operations performed when a failure occurs are the same as the operations described with reference to FIG. 4.

Figure 10:
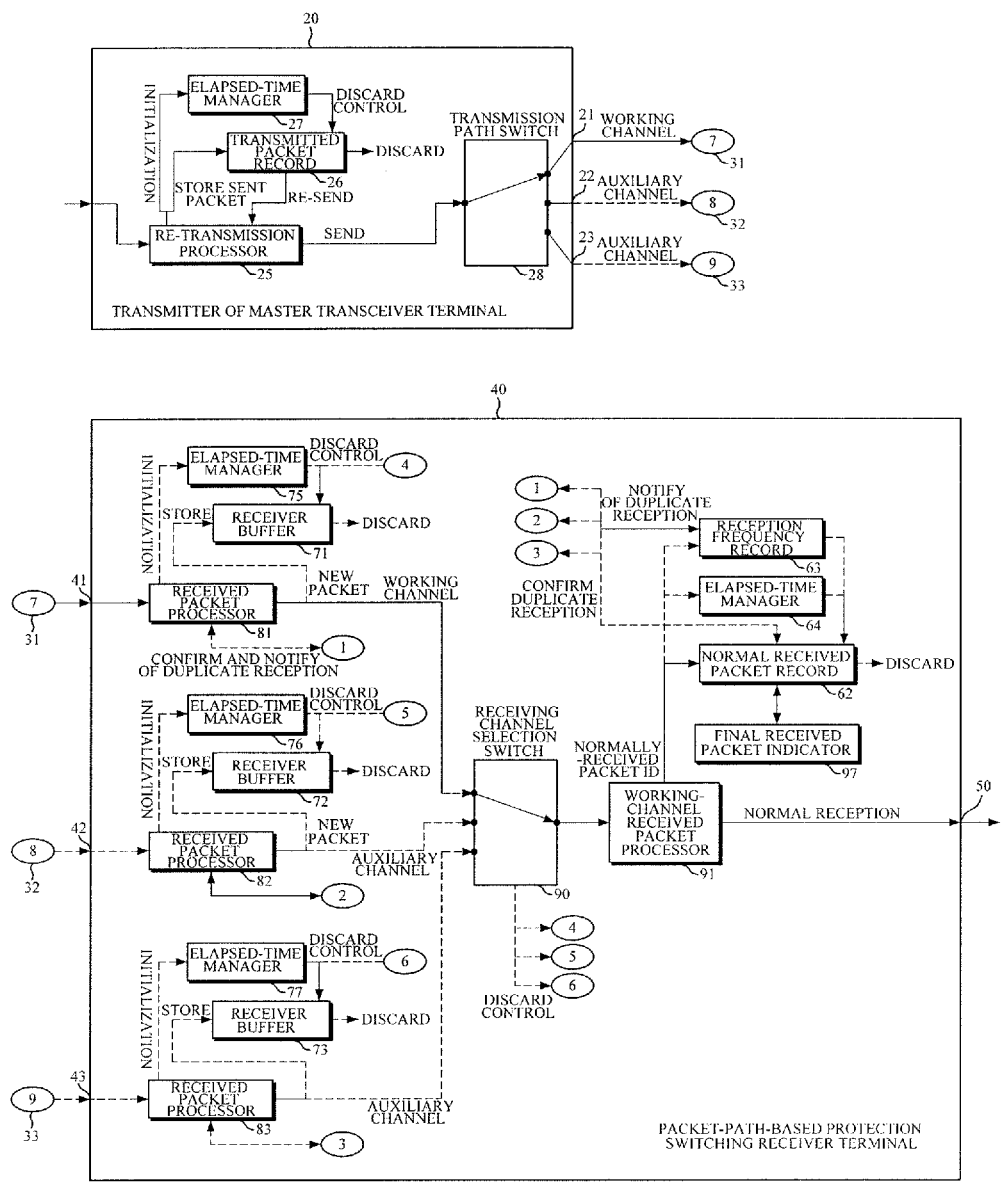
FIG. 10 is a diagram illustrating N:1 packet-path-based protection switching in the packet or passive optical network system of FIG. 7.

FIG. 10 is a diagram illustrating N:1 packet-path-based protection switching in the packet or passive optical network system of FIG. 7, which is performed in the same manner as the protection switching of FIG. 5.

The working-channel received packet processor 81 at the receiver terminal 40 functions as the re-reception processor 66 of FIG. 5, and the normal received packet record 62 and the final received packet indicator 97 provide the same function as the final received packet record 67 of FIG. 5. If a failure occurs, protection switching is performed in the same manner as the protection switching illustrated in FIG. 6.

Figure 11:
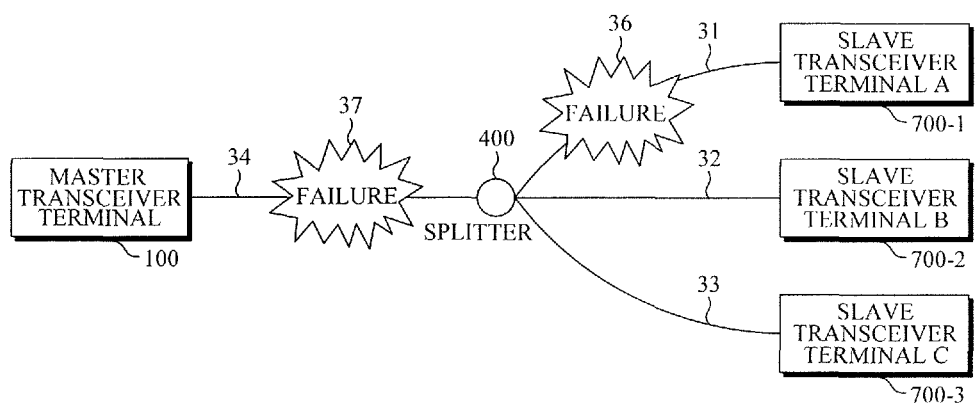
FIG. 11 is a block diagram illustrating yet another exemplary embodiment of a packet or passive optical network system.

FIG. 11 is a block diagram illustrating yet another exemplary embodiment of a packet or passive optical network system. FIG. 11 illustrates a network shared in a 1:N fashion (hereinafter, it will be referred to as a "1:N shared network") in which one physical packet path 34 is divided into a plurality of packet paths 31, 32, and 33 by a splitter 400, thus connecting a master transceiver terminal 100 to a plurality of slave transceiver terminals 700-1, 700-2, and 700-3.

For convenience of explanation, transmission from left to right is assumed as downlink transmission and transmission from right to left is assumed as uplink transmission. A downlink packet through the packet path 34 is transferred to all packet paths 31, 32, and 33, and simultaneously, uplink packets carried by the packet paths 31, 32, and 33 are combined by the splitter 400 and then transferred to the packet path 34.

The uplink packets on the packet paths 31, 32, and 33 are merged on the packet path 34 and at this time, a packet collision may occur. To avoid a collision of uplink packets, the packet paths between the transceiver terminals are wavelength-/frequency-divided or time-divided to form non-collision, independent channels; the master transceiver terminal 100 allocates and manages the channels; and the slave transceiver terminals operate according to the operation of the master transceiver terminal 100. Thereby the 1:N channels can be changed into N number of 1:1 communication channels. A passive optical subscriber network is a representative example of such network. In FIG. 11, a failure 36 only affects a corresponding slave transceiver A, while a failure 37 affects all slave transceivers A, B and C.

Figure 12:
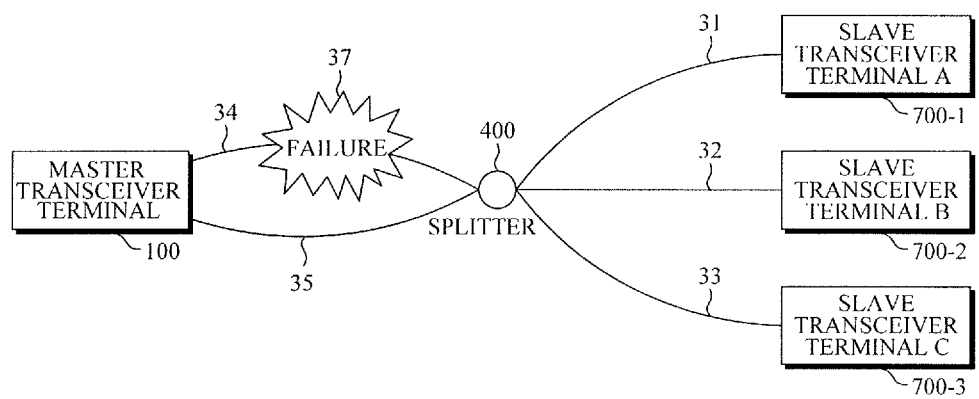
FIG. 12 is a block diagram illustrating another exemplary embodiment of a packet or passive optical network system.

FIG. 12 is a block diagram illustrating another exemplary embodiment of a packet or passive optical network system. FIG. 12 shows a network shared in a 2:N fashion (hereinafter, it will be referred to as a 2:N shared network"). A downlink packet on packet path 35 is transferred to packet paths 31, 32, and 33, and uplink packets on the packet paths 31, 32, and 33 are transferred to both packet paths 34 and 35.

A downlink packet transferred through the packet path 34 and a downlink packet transferred though the packet path 35 collide in the packet paths 31, 32, and 33. To avoid a collision of downlink packets, the packet paths may be wavelength-/frequency-divided or time-divided, as done for uplink packets. However, generally, the collision of downlink packets is prevented by using only one of the two packet paths 34 and 35.

At this time, the other packet path is used as an auxiliary path to bypass a working packet in the case of a failure on any packet path. For example, if a failure 37 occurs on the packet path 34, as shown in FIG. 12, the packet is bypassed through packet path 35 so that the slave transceiver terminals A, B, and C can continue to operate normally.

Figure 13:
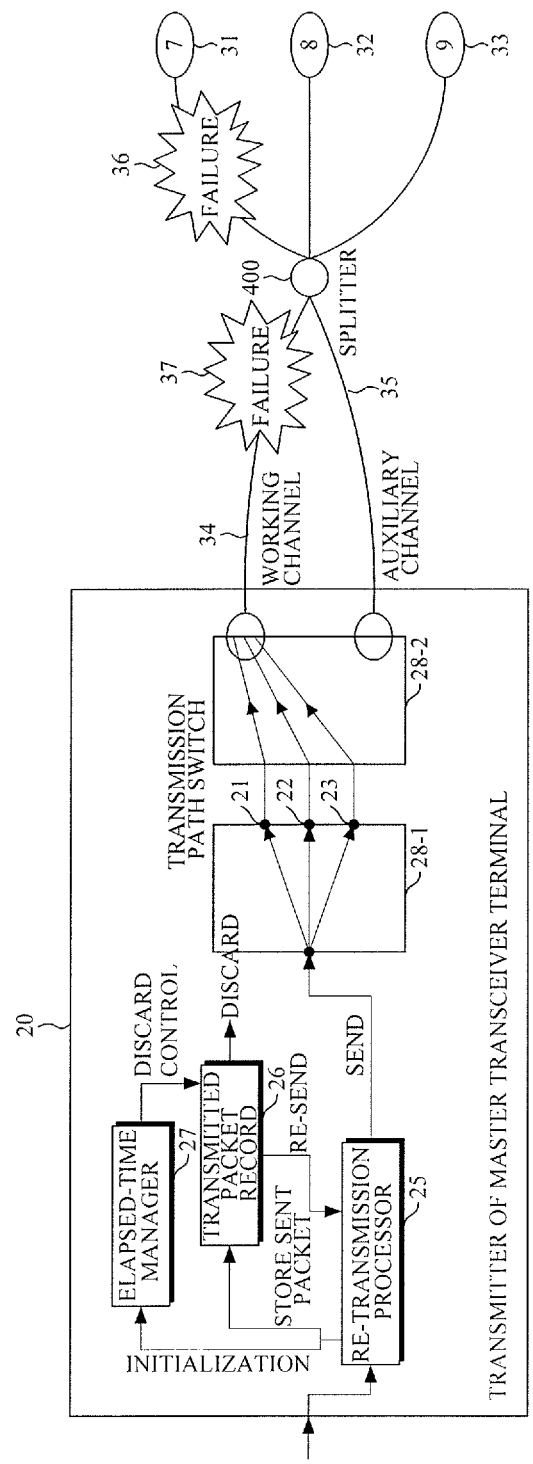
FIG. 13 is a block diagram illustrating yet another exemplary embodiment of a packet or passive optical network system with packet-based protection switching capabilities.

FIG. 13 is a block diagram illustrating yet another exemplary embodiment of a packet or passive optical network system with packet-based protection switching capabilities. FIG. 13 illustrates a transmitter 20 of a master transceiver terminal 100 when the comprehensive packet-based protection switching mechanism is applied to the 2:N shared network of FIG. 12.

A receiver is configured in each of the slave transceiver terminals A, B, and C, and each receiver has the same configuration as that of the receiver terminal of FIG. 8 or FIG. 9 depending on protection switching mechanism. Specifically, the receiver may have the same configuration as the receiver terminal of FIG. 8 in the case of packet-based protection switching and have the same configuration as the receiver terminal of FIG. 9 in the case of packet-path-based protection switching.

In this case, reference numerals 7, 8, and 9 in FIG. 13 may be linked to reference numerals 7, 8, and 9 shown at the receiver terminal in FIG. 8 or FIG. 9 according to the protection switching mechanism. The exemplary embodiment shown in FIG. 13 is a network system that applies 1:1 packet-based protection switching mechanism to working modes illustrated in FIG. 8 and FIG. 9. A transmitter 20 at the master transceiver terminal of FIG. 13 includes a re-transmission processor 25, a transmitted packet record 26, and an elapsed-time manager 27, as does the transmitter terminal shown in FIG. 5. The transmission channel switch consists of two stages: a first-stage switch 28-1 being connected to all channels corresponding to packet paths 31, 32, and 33 and a second-stage switch 28-2 being connected to only one of packet paths 34 and 35. In FIG. 13, the second-stage switch 28-2 is connected to the packet path 34.

During normal operation, a packet through the packet path 34 is sent via the packet paths 31, 32, and 33. The slave transceiver terminal of FIG. 13 receives packets sent through packet paths 31, 32, and 33 and operates as described in FIG. 8 and FIG. 9. In the event of a failure 36 as shown in FIG. 13, relevant protection switching is performed as described in FIG. 8 and FIG. 9.

However, if a failure 37 occurs on the packet path 34, 1:1 protection switching mechanism is initiated, whereby the second-stage switch 28-2 switches from the working channel packet path 34 to the auxiliary channel packet path 35 and the re-transmission processor 25 re-sends the packet.

When the failure 37 occurs, 1:1 protection switching reception capability is further necessary, in addition to the capabilities described in FIGS. 8 and 9. The additionally needed capability is to operate the final received packet indicator in a normal working state, and when a packet marked for re-transmission is received while the final received packet indicator is operating, it is determined that 1:1 protection switching is needed and the working-channel received packet processor (91 in FIG. 8 or FIG. 9) temporarily serves the function of the re-reception processor 66 of FIG. 7 to perform protection switching.

Figure 14:
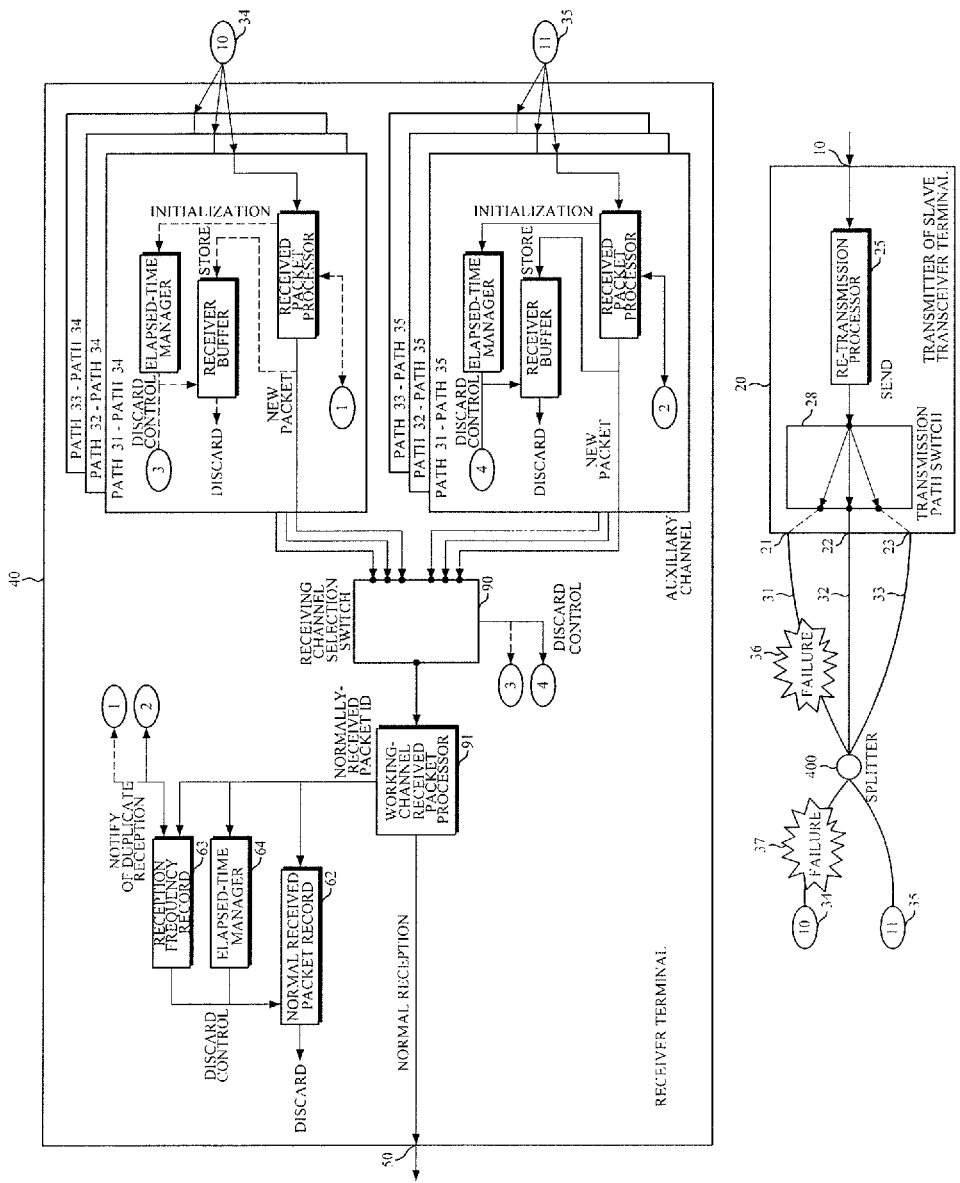
FIG. 14 is a block diagram illustrating still another exemplary embodiment of a packet or passive optical network system with packet-based protection switching capabilities.

FIG. 14 is a block diagram illustrating still another exemplary embodiment of a packet or passive optical network system with packet-based protection switching capabilities. FIG. 14 illustrates a receiver 40 of a master transceiver terminal 100 when comprehensive packet-based protection switching mechanism is applied to the 2:N shared network in the packet or passive optical network system of FIG. 12.

To an uplink channel, only the protection switching mechanism of FIG. 8 or FIG. 9, and not N:1 packet-path-based protection switching mechanism, is applied. The receiving channel selection switch 90 of the receiver 40 at the master transceiver terminal 100 operates in a manner, as described in FIG. 2 or FIG. 3.

That is, in the case of the packet-based protection switching as shown in FIG. 8, all packets that have passed through the packet paths 31, 32, 33, 34, and 35 are transferred to the working-channel received packet processor 91. In the case of the packet-path-based protection switching as shown in FIG. 9, all packets that have passed through the packet paths 31, 32, 33, 34, and 35 are received, and only specific packets that are carried by the packet paths 31 and 34 are transferred to the working-channel received packet processor 91.

In a normal working state, packets are transmitted to all channels of the packet paths 31, 32, and 33. In the mechanism of FIG. 8, the packets transmitted through all paths are received at the receiver terminal according to the packet-based protection switching mechanism, and in the mechanism of FIG. 9, the packets transmitted through all paths are received, but only the packets carried by working channels of the packet path 31 and the packet path 34 are transferred to the working-channel received packet processor 91 to complete a normal receiving process.

In the occurrence of a failure 36, the mechanism of FIG. 8 readily performs protection switching since real-time packet-based protection switching is carried out all the time during the normal working state, and the mechanism as shown in FIG. 9 performs protection switching by switching the working channel that passes through the packet path 31 and the packet path 34 to a channel that passes through the packet path 32 and the packet path 34.

In the occurrence of a failure 37 on the packet path 34, the mechanism of FIG. 8 performs protection switching all the time since this protection switching is performed on a packet-by-packet basis, and the mechanism of FIG. 9 performs protection switching by switching the working channel that passes through the packet paths 31 and 34 to the channel that passes through the packet path 31 and the packet path 35.

Figure 15:
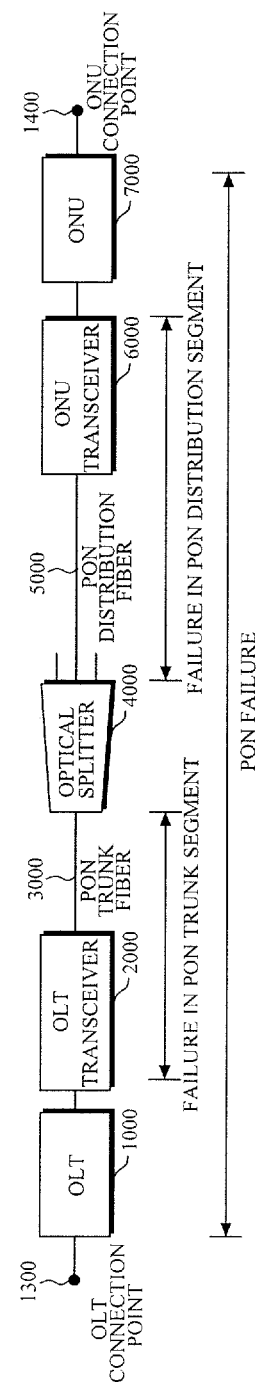
FIG. 15 is a block diagram illustrating PON network components.

A method of configuring a PON protection switching apparatus by using the 2:N comprehensive packet-based protection switching mechanisms shown in FIGS. 13 and 14 is provided. FIG. 15 is a block diagram illustrating PON network components.

Referring to FIG. 15, the PON includes an optical line terminal (OLT) 1000, an OLT transceiver 2000, a PON trunk fiber 3000, an optical splitter 4000, a PON distribution fiber 5000, an optical network unit (ONU) transceiver 6000, and an ONU 7000.

The space between the OLT 1000 and the optical splitter 4000 is referred to as a "PON trunk segment," and a space between the optical splitter 4000 and the ONU 7000 is referred to as a "PON distribution segment." The present disclosure provides a protection switching mechanism and a configuration of an apparatus for dealing with failures that occur across the entire segment from the OLT 1000 to the ONU 7000 and maintenance of the segment. Since a failure in the PON trunk segment or the maintenance of the PON trunk segment affects a plurality of ONUs 7000 that are connected to a specific OLT 1000, protection switching in the PON trunk segment is important. Meanwhile, a failure in the PON distribution segment only affects the specific ONU 7000, but what is still required is to devise a protection switching method for a failure which can minimize the influence on other ONUs.

Figure 16:
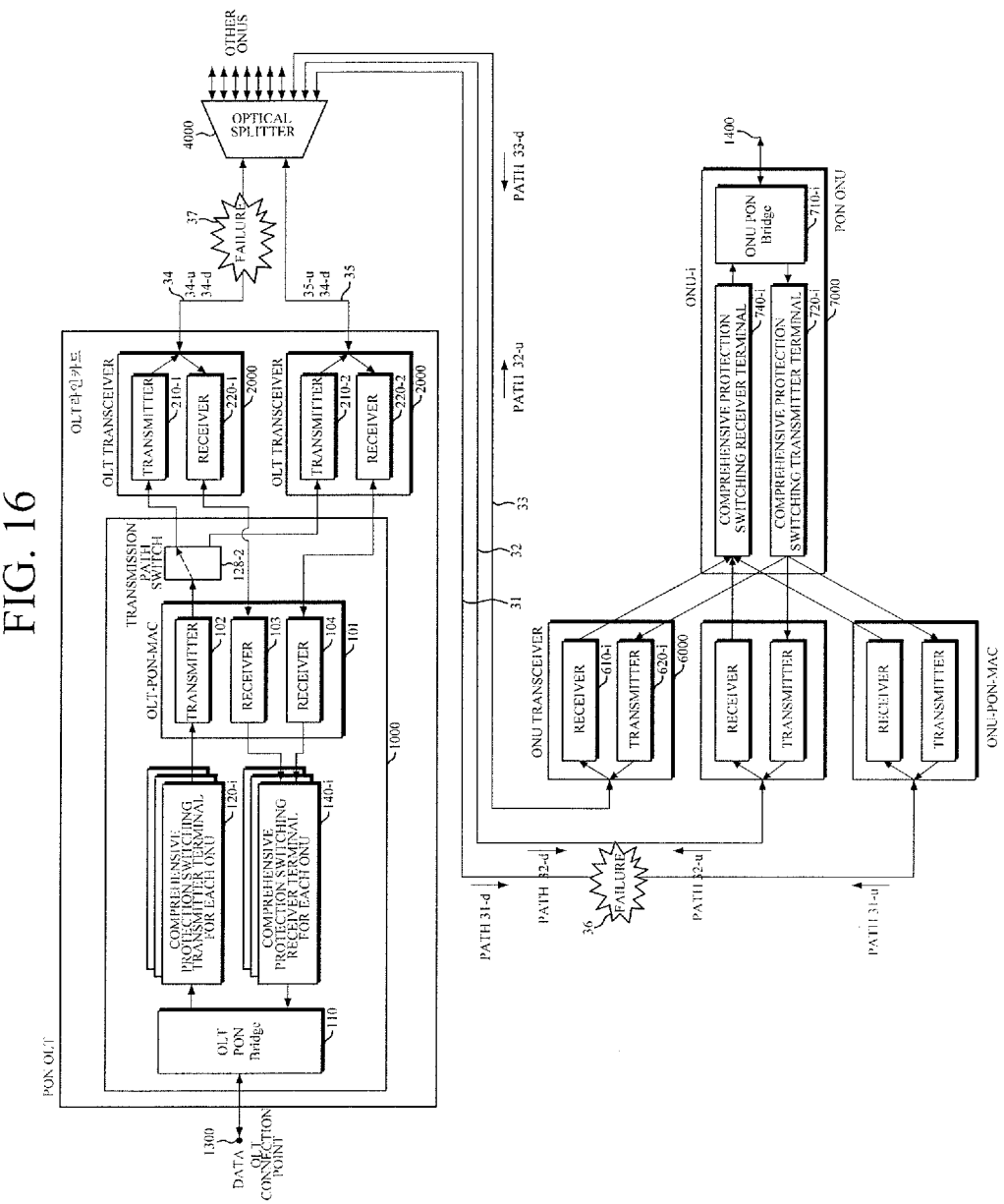
FIG. 16 is a block diagram illustrating yet another exemplary embodiment of a packet or passive optical network system with packet-based protection switching capabilities.

FIG. 16 is a block diagram illustrating yet another exemplary embodiment of a packet or passive optical network system with packet-based protection switching capabilities. FIG. 16 shows a protection switching mechanism in which comprehensive packet-based protection switching is applied to a PON.

The comprehensive path-based protection switching function is provided for each logical link between OLT 1000 and ONU 7000. A comprehensive protection switching transmitter terminal 120-*i*, exclusive of the second-stage switch 28-2 of the transmitter terminal 20 shown in FIG. 13, is provided for each of a plurality of ONUs 7000. Said ONUs 7000 are connected to the OLT 1000 through an optical splitter 400 and outputs of the first-stage switch 28-1 of a transmission path switch, which can be found in the transmitter terminal 20 shown in FIG. 13, are defined as logical links in each PON, and are connected as inputs to an OLT multi-access transmitter 102 together with logical links corresponding to the other ONUs. An output from a PON multi-accessing component 101 is connected to two optical transmitters 210-1 and 210-2 through the transmission path switch 128-2.

Here, the path switch 128-2 functions as the second-stage switch 28-2 of the transmission path switching at the transmitter terminal of FIG. 12, and logical links of all ONUs 7000 share the path switch 128-2. A downlink packet delivered from the OLT 1000 to the ONU 7000 is connected to the ONU 7000 through the packet paths 34-*d*, 31-*d*, 32-*d*, and 33-*d*. The receiver terminal is implemented at the ONU 7000 and completes the configuration of a downlink channel.

The transmitter terminal of the ONU 7000 may be implemented as the transmitter terminal of FIG. 14, and an output thereof is transferred to the OLT 1000 through packet paths 31-*u*, 32-*u*, 33-*u* and 35-*u*. At the OLT 1000, an optical receiver 220-1 receives the packet through a packet path 34-*u*, and another optical receiver 220-2 receives the packet through another packet path 35-*u*. Incoming signals are received by additional PON multi-access receivers 103 and 104, respectively.

Outputs of the PON multi-access receivers 103 and 104 are distinguished by logical channels for communications with ONUs 7000, and thus six logical channels corresponding to all combinations of the logical channels, i.e., packet paths 31-*u*, 32-*u*, and 33-*u*, which are associated with the respective ONUs 7000, and packet paths 34-*u* and 35-*u* are output.

In the case where the system is being operated in the same way as shown in FIG. 8, the reception and protection switching operations as shown in FIG. 14 are performed by setting all six channels as receiving inputs. If a failure 36 occurs in the PON distribution segment, protection switching as shown in FIG. 8 or FIG. 9 is performed in both uplink and downlink according to the designated protection switching mode.

If a failure 37 occurs in the PON trunk segment, 1:1 packet-path protection switching is performed in downlink channels, and protection switching as shown in FIG. 8 or FIG. 9 is performed in uplink channels according to the protection switching mode set as described with reference to FIG. 14. The protection switching mode for the uplink channels and the protection switching mode for the downlink channels may be set independently of each other without correlation between them.

Figure 17:
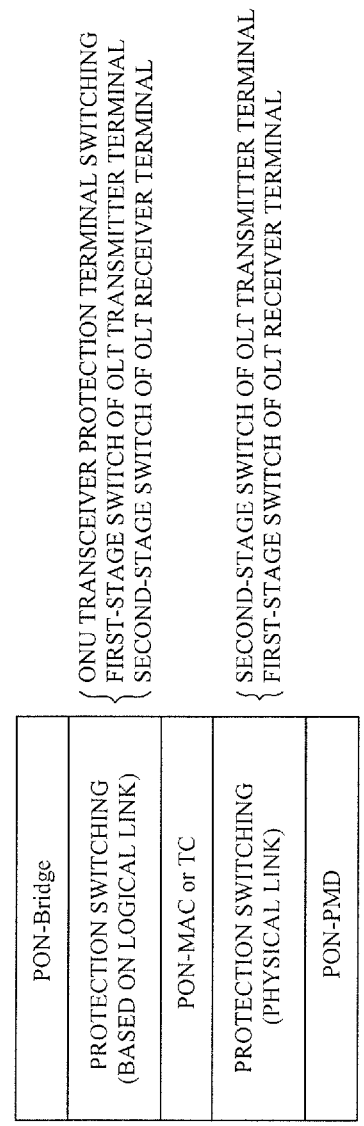
FIG. 17 is a table showing functional positions of protection switching switches in a passive optical network.

FIG. 17 is a table showing functional positions of protection switching switches in a passive optical network. PON-Bridge has a switching function that is performed based on a logical link port. PON-MAC refers to a MPCP MAC function of EPON (IEEE802.3 PON) or TC function of GPON (ITU-T SG15 PON), and PON-PMD refers to a function related to a communication medium with optical transmission/reception capabilities.

ONU protection switching feature is positioned between PON-Bridge and PON-MAC and protection switching is performed based on a logical link of the PON. OLT protection switching features are positioned between PON-MAC and PON-Bridge and between PON-MAC and PON-PMD. The protection switching feature positioned between PON-MAC and PON-PMD is provided for protection switching against failures that may occur in the PON trunk segment. The second-stage switch for transmission path protection switching of the OLT transmitter terminal and the first-stage switch of receiving channel protection switching switch of the OLT receiver terminal correspond to such features.

The OLT protection switching feature positioned between PON-Bridge and PON-MAC is provided for protection switching against a failure occurring in the PON distribution segment, for which the corresponding features are the first-stage switch of a transmission path switch of the OLT transmitter terminal and a path switch of a receiving channel protection switching switch of the OLT receiver terminal and in which protection switching is performed based on a PON logical link.

The aforementioned comprehensive packet-based protection switching mechanism is implemented in an OLT side; various forms of ON Us, including an ONU without a protection switching function, as well as an ONU with the comprehensive protection switching function as shown in FIG. 16, may be provided in the ONU side.

Figure 18:
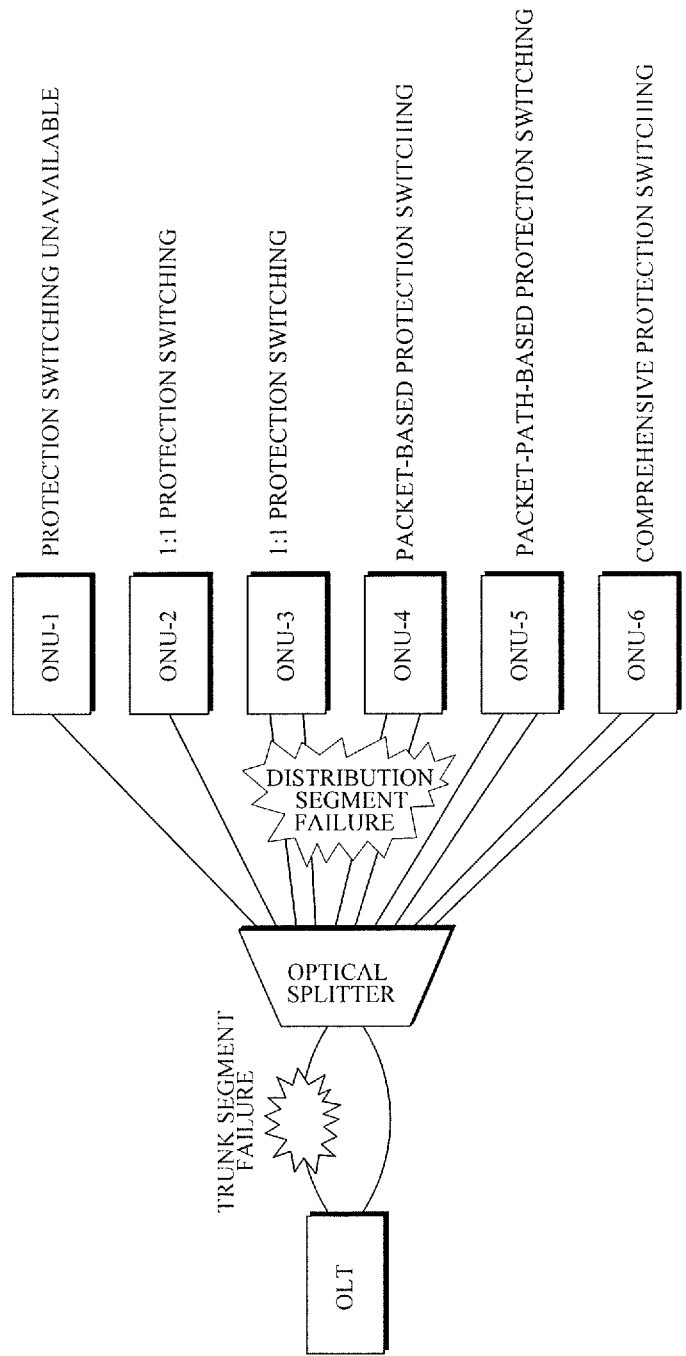
FIG. 18 is a diagram illustrating a passive optical network in which various forms of ONUs are installed.

FIG. 18 is a diagram illustrating a passive optical network in which various forms of ONUs have been installed. ONU-1 does not provide a protection switching function; ONU-2 provides only a re-reception processing function shown in FIG. 5; ONU-3 provides 1:1 packet path protection switching, as shown in FIG. 5, in both transmission and reception; ONU-4 provides a packet-based protection switching function; ONU-5 provides a packet-path protection switching function, as shown in FIG. 3 or FIG. 9; and ONU-6 provides a comprehensive packet-based protection switching function. Below is a table showing protection switching characteristics against the failure 36 (PON distribution segment failure) and the failure 37 (PON trunk segment failure).

switching by subscribers, thereby improving the service quality of subscriber networks and increasing the service reliability. Therefore, the application of PON can be expanded to the various fields of access network, such as broadband wireless access.

The embodiments of the present disclosure can be efficiently applied to the fields of protection switching of a packet-based network and protection switching of a passive optical network, and to the applications thereof.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:
1. A packet or passive optical network system with a packet-based protection switching capability, comprising:
   a transmitter terminal;
   a plurality of packet paths; and
   a receiver terminal,
   wherein the receiver terminal receives a packet that arrives first among identical packets transferred

TABLE 1

| OLT: Combined protection switching | Distribution segment failure (Failure 36) | Trunk segment failure (Failure 37) | Characteristics |
|---|---|---|---|
| ONU-1 | Interruption of communication between ONU and OLT | Packet loss during ONU protection switching, OLT receiver lossless protection switching | |
| ONU-2 | Interruption of communication between ONU and OLT | ONU, OLT lossless protection switching | |
| ONU-3 | ONU, OLT lossless protection switching | ONU, OLT lossless protection switching | High bandwidth usage efficiency, switching delay occurred |
| ONU-4 | ONU, OLT lossless protection switching | Packet loss during ONU protection switching, OLT receiver lossless protection switching | Operation without regard to failure occurrence signal, packet loss occurred and packet loss order not ensured against distribution segment failure |
| ONU-5 | ONU, OLT lossless protection switching | Packet loss during ONU protection switching, OLT receiver lossless protection switching | Failure occurrence signal exchange and switching synchronization required, packet loss order ensured against distribution segment failure |
| ONU-6 | ONU, OLT lossless protection switching | ONU, OLT lossless protection switching | Dealing with failures in the entire segments, such as trunk segment and distribution segment |

According to the embodiments as described above, packet-path protection switching is implemented in a general packet network, so that it is possible to provide, in the packet network, a quality of service that is on a par with a cable circuit. It is also possible to implement lossless protection switching against failures that occur in any segment of the PON, including failures that arise in OLTs, optical cables, and ONUs of the PON system. Further, it is possible to efficiently respond to various requests for protection through the plurality of packet paths and discards packets that arrive after the first packet,
wherein the receiver terminal comprises: a duplicate reception prevention filter configured to normally receive the packet that arrives first among the identical packets transferred through the plurality of packet paths and discard packets that arrive after the first packet; and a normal received packet record configured to store a packet that has been previously normally received or a packet identifier of the normally received packet, thereby enabling the duplicate reception prevention filter to determine whether the same packet as the stored packet arrives at the receiver terminal.

2. The packet or passive optical network system of claim 1, wherein the receiver terminal further comprises a reception frequency record configured to count the number of times identical packets are received through the plurality of packet paths in order to enable deletion of a record of the identical packet from the normal received packet record when it is confirmed that the identical packets are received through all packet paths.

3. The packet or passive optical network system of claim 1, wherein when at least two packet paths carry identical packets and the same packet as the received packets is stored in the normal received packet record, the duplicate reception prevention filter discards the received packets, and otherwise if the same packet as the received packets is not present in the normal received packet record, the duplicate reception prevention filter normally receives the packets and stores the received packets or identifiers of the packets in the normal received packet record.

4. The packet or passive optical network system of claim 1, wherein the receiver terminal measures the time that has elapsed since a packet or its packet identifier was stored in the normal received packet record and, in turn, deletes a record of the packet after a sufficient amount of time.

5. A packet or passive optical network system with a packet-based protection switching capability, comprising;
   a transmitter terminal;
   a plurality of packet paths; and
   a receiver terminal,
   wherein the receiver terminal receives a packet that arrives first among identical packets transferred through the plurality of packet paths and discards packets that arrive after the first packet,
   wherein the receiver terminal stores a previously normally received packet or a packet identifier of the previously normally received packet to determine whether the packet is same as the stored previously normally received packet.

* * * * *